United States Patent
Knighten

(10) Patent No.: US 6,227,793 B1
(45) Date of Patent: May 8, 2001

(54) DOOR TRANSPORT SYSTEM

(75) Inventor: Charles A. Knighten, Chico, CA (US)

(73) Assignee: Norfield Industries, Chico, CA (US)

( * ) Notice: Subject to any disclaimer, the term of this patent is extended or adjusted under 35 U.S.C. 154(b) by 0 days.

(21) Appl. No.: 09/318,232

(22) Filed: May 25, 1999

(51) Int. Cl.⁷ ...................................................... B25J 9/04
(52) U.S. Cl. .................................... 414/744.5; 294/119.1; 414/744.3; 901/21
(58) Field of Search ...................... 294/119.1; 414/744.3, 414/744.5, 744.8, 796.9, 797; 901/21

(56) References Cited

U.S. PATENT DOCUMENTS

| | | | |
|---|---|---|---|
| 1,974,837 | * 9/1934 | Shillinger et al. | 414/744.3 X |
| 2,628,726 | 2/1953 | Van Schie . | |
| 4,254,895 | * 3/1981 | Cheak | 227/50 |
| 4,503,722 | * 3/1985 | Suzuki et al. | 901/21 X |
| 4,552,501 | 11/1985 | Clark et al. | 414/486 |
| 4,637,773 | * 1/1987 | Nakashima et al. | 901/21 X |
| 4,978,274 | * 12/1990 | de Groot | 414/744.3 |
| 5,199,845 | 4/1993 | Hirashima et al. | 414/744.1 |
| 5,391,050 | 2/1995 | Gatteschi | 414/796 |
| 5,564,893 | 10/1996 | Tacchi et al. | 414/796.9 |
| 5,927,937 | * 7/1999 | Anderson | 414/744.3 X |
| 6,068,438 | * 5/2000 | Barry | 414/744.3 X |

FOREIGN PATENT DOCUMENTS

| | | |
|---|---|---|
| 6171762 | 6/1994 | (JP) . |
| 1579718 | 7/1990 | (SU) . |
| 1627483 | 2/1991 | (SU) . |
| 1646781 | 5/1991 | (SU) . |

OTHER PUBLICATIONS

KVAL Automated Door Systems, pp. 8 and 20 (No date).
Brochure: RUVO 2000 Unloading/Stacking Equipment (2 pages) (No date).

* cited by examiner

Primary Examiner—Janice L. Krizek
(74) Attorney, Agent, or Firm—Townsend and Townsend and Crew LLP

(57) ABSTRACT

A door transport system includes a carriage slidably mounted on an upright column for movement therealong. A swing arm, pivotally mounted to the carriage, carries at its distal end a gripper mechanism. The gripper mechanism is connected to the swing arm so that as the swing arm is moved through an arc to place its distal end over selected ones of door pickup stations for door pickup and transport to a workstation, the orientation of the gripper mechanism remains unchanged.

20 Claims, 7 Drawing Sheets

DOOR TRANSPORT SYSTEM

BACKGROUND OF THE INVENTION

The present invention is directed generally to the manufacture of pre-hung doors, and more particularly to an automated system capable of selecting a door from one of a number of loading stations for pickup and transport to a work station.

In the construction industry it has long been found expedient to order, and have on hand at the construction site, pre-prepared or pre-hung doors of various sizes and handedness (i.e., the sides of a door at which hinge and door locks are installed). A builder may require several sizes and types of doors for a particular house or building being constructed. For example, some doors may need to be pre-prepared only to have the necessary lock and/or latch hole drilling on door edge, and hinge routing at the other, so that they open away to the right. Other doores may be needed to open away to the left. Thus, door locks, latches, and hinges for the former need to be installed on edges opposite to those for the latter. (Installation may either be at the construction site or by the manufacturer.)

The manufacture of doors, including pre-prepared and pre-hung doors, can be labor intensive. Thus, to reduce costs, the door manufacturing industry has resorted to automation wherever possible in order to reduce many of the labor-intensive aspects of door manufacture, providing automated workstations at which the various door preparation activities can take place. An example of such automated door preparation systems can be found in U.S. Pat. No. 4,254,895.

Today, however, door manufacture still has costly, labor-intensive aspects. Transporting doors to the workstation is one example. Although conveyors can be used to transport a door to the workstation, someone must still make door selection (size, style, hinged side, etc.) to place it on the conveyor for transport to the workstation. An order for doors may include 20 doors of one size, 20 more doors of the same size but with a different handedness (i.e., the edge on which the hinges and locks are to be placed), and 20 more doors of a different size. Someone must make the selection, place them on the conveyor belt (or other transport means) for transport to the workstation, and then off-load the doors from the conveyor belt to the workstation for preparing the doors.

Accordingly, there is needed in the door manufacturing industry apparatus that can conveniently and quickly transport different sizes of doors to a workstation without too much manual intervention.

SUMMARY OF THE INVENTION

The present invention is directed to a door transport system capable of selecting between at least two door pick-up stations to pick up a door from one of the pick-up stations for transport to a workstation.

In one embodiment of the invention, a swing arm is pivotally mounted to a vertical column to extend laterally thereof and move through an arc to place a distal end of the swing arm in overlying relation to stacks of doors (pick-up stations). Attached at the distal end of the swing arm is a gripping mechanism capable of grasping a door for removal from a stack and transport to a workstation. The swing arm includes a master sprocket fixedly connected at the pivot point, a slave sprocket mounted at the distal end and connected to the door pick-up mechanism. The two sprockets are connected so that movement of the swing arm about the pivot point will produce a concomitant movement of the pick-up mechanism in a manner that causes the door pick-up mechanism to maintain its position relative to the stacks of doors and workstation.

In another embodiment of the invention the coupling between the master and slave sprockets includes pneumatically or hydraulically operated cylinders that operate to rotate the door pick-up mechanism for repositioning the door as desired. In a preferred embodiment of the invention the coupling between the master and slave sprockets is a chain that includes two cylinder pairs.

In use, the swing arm may be rotated about its pivot point to position the door pick-up mechanism in overlying relation to one or another stack of doors. The swing arm can then be lowered to bring the door pick-up mechanism into engagement with the door at the top of the selected stack. The door is grasped by the door pick-up mechanism, and the swing arm rotates again to transport the door to the workstation.

A number of advantages are achieved by the present invention. First, the automated nature of the system reduces much of the labor presently needed for handling the door to transport it to a workstation, as well as reducing the potential for back injuries of a person that must carry the door.

In addition, the ability to select between different stacks of doors allows the system to be used to fill a order of variety of doors. That is, different size doors can be placed in different stacks, and the doors from one stack and then the other transported to the workstation for pre-preparation and/or pre-hanging activities.

Further, since most workstations for door preparation have the hinge-routing and door lock-drilling mechanism for only one side of the door, the rotational capability of the door pick-up mechanism allows the user to change the handedness of the doors being prepared.

These and other features and advantages of the invention will become apparent to those skilled in this art upon a reading of the following detailed description of the invention, which should be taken in conjunction with the accompanying drawings.

DETAILED DESCRIPTION OF THE INVENTION

Figure 1:
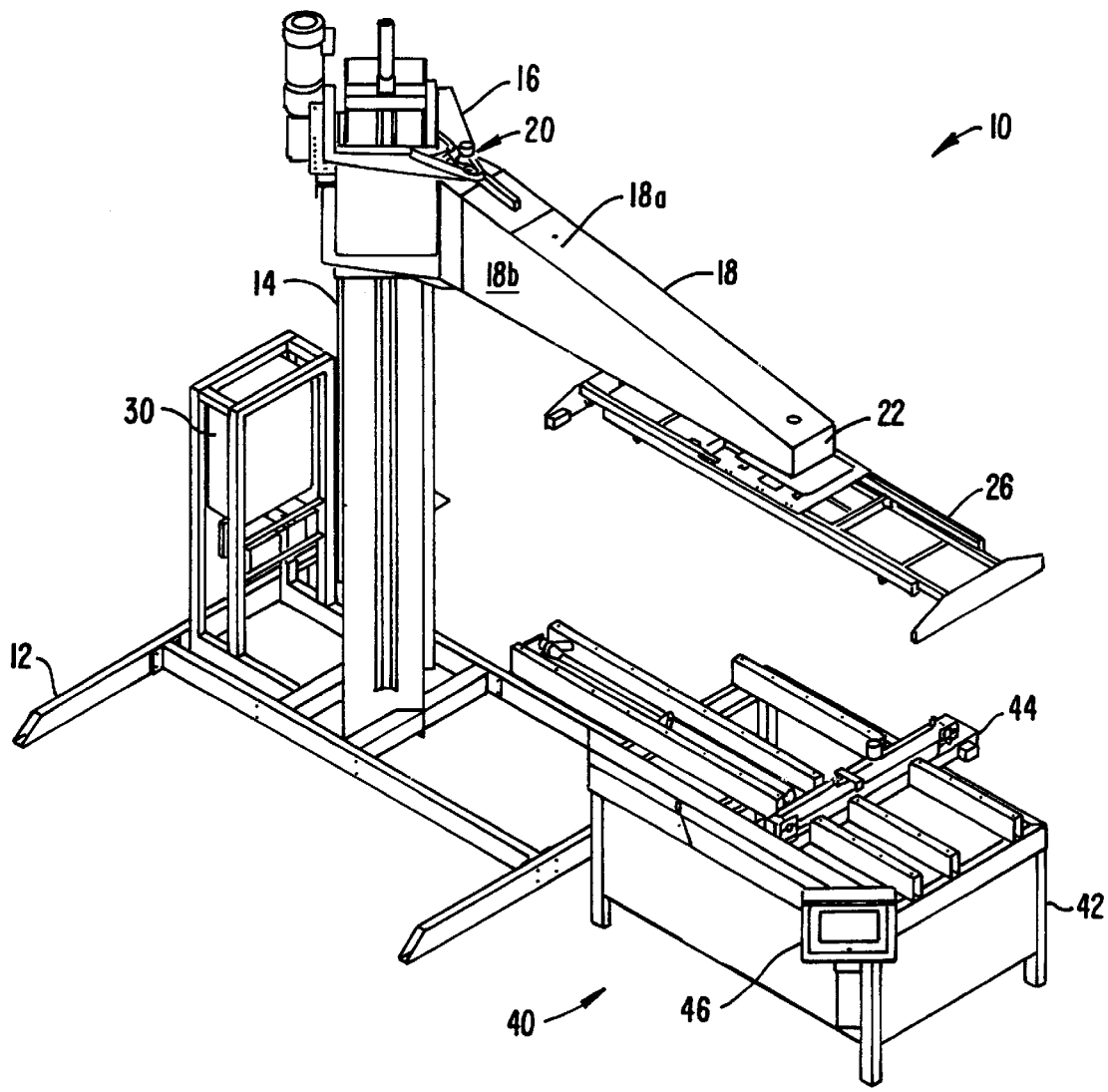
FIG. 1 is an isometric view of the door transport system of the present invention.

Turning now to the figures, and specifically FIG. 1, there is illustrated the door transport system of the present invention. Designated with the reference numeral 10, the transport system is shown as including a base 12 that supports a vertically extending column 14. Slidably mounted to the column 14, for vertical movement thereon, is a motorized carriage 16 from which extends a swing arm 18. The swing arm 18 is pivotally mounted to the carriage 16 at 20 so that its distal end 22 can be horizontally moved through the arc A (FIG. 2)—here a 270 degree arc, although those skilled in the art will readily realize that the arc distance can be any value.

Rotatably mounted proximate the distal end 22 of the swing arm 18 is a gripper mechanism 26 structured, as will be described more fully below, to be positioned in alignment with stacks of doors to grip and remove a door from such stacks.

Also mounted to the stand 12 is a control cabinet 30 containing the various electronic and electromechanical control apparatus necessary for operation of the system 10.

Finally, FIG. 1 illustrates a workstation 40 of generally conventional design and construction for door preparation. (I.e., the workstation 40 will preferably be equipped with the necessary routing and drilling equipment for hinge routing and lock drilling.) As FIG. 1 generally illustrates, the workstation 40 includes a table 42 on which is mounted conventional door preparation equipment as desired (identified generally with the reference numeral 44). In addition, the workstation table 42 includes a control console which would be coupled, by appropriate electrical wiring (or, if desired, infrared wireless connection) a control console 46 for user control of the various elements of the transport system 10.

Figure 2:
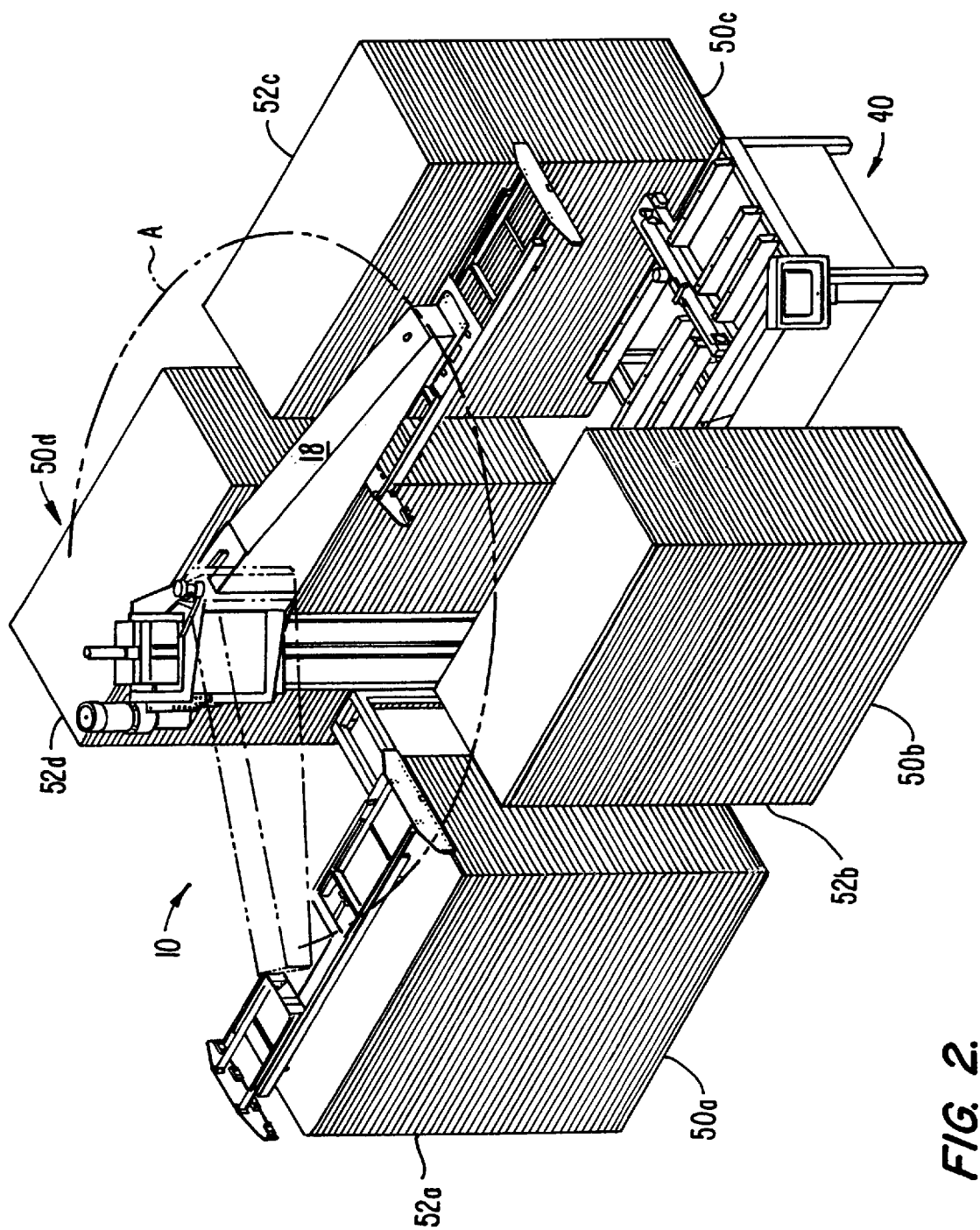
FIG. 2 is the door transport system of FIG. 1 shown with four door loading stations, illustrating the capability of the invention to selectively transport doors from any one of the four loading stations to a work station.

FIG. 2, which illustrates the transport system 10 in conjunction with stacks of doors at prelocated pick-up stations, also illustrates an important feature of the invention. As FIG. 2 shows, system 10 has four pickup stations 50, (50a, 50b . . . 50d) located at generally predetermined positions about the column 14. Stacked, at each of the pickup 50, are stacks of doors 52. The first feature of the invention is that as the swing arm 18 is moved through the arc A to position the gripper mechanism 26 in an overlying relation to one or another pickup station 50 (and the stacks 52 of doors thereat), the gripper mechanism maintains an orientation parallel to the doors and to the workstation 40. One advantage of this feature is that the workstations 50 may be formed by conveyor belts (not shown) that allow stacks of doors to be moved in to positions as shown in FIG. 2. For example, the pickup stations 50a and 50b would be fed by one conveyor belt (not shown), and pickup stations 50c and 50d fed by another.

A second important feature of the invention is that the stacks of doors 52 may differ in size (and, if desired, doors within each stack may differ in size). This allows an order for different size doors to be filled using the system of the invention, merely by stacking doors of one size at one pick-up station 50 (e.g., pick-up station 50a) while stacking doors of another size at a second pick-up station (e.g., pick-up station 50b). Assuming the order requires pre-prepared doors of both sizes, the system 10 can be commanded to first pick-up the doors at pick-up station 50a, transporting them to the workstation 40 where the lock drilling and latch routing is performed. Then, when all of the doors of that particular size have been pre-prepared, doors of the different size, e.g., those at pick-up station 50b, may then be sequentially transported from the stack 52b at the pick-up station 50b to the workstation 40 for lock drilling and latch routing. (Although the workstation 40 is described in terms of only performing lock drilling and latch routing, other operations such as pre-hanging the door may also be performed.)

A third important feature of the invention, as will be more fully explained below, is the ability of the gripper mechanism to be rotated 180°. This feature allows doors to be transported to workstation 40 regardless of the handedness needed, even though the hinge-routing and lock-drilling mechanisms may be on only one respective side of the workstation. For example, a door may be removed from the stack 52a, and transported to the workstation 40 for the pre-preparation operation as a right-handed door. Suppose now, however, that a door of the same size, from the panel stack, but of a different handedness is needed. In order to accommodate this requirement, the gripper mechanism 26 may pick up the door from one of the stacks 52, rotate it 180°, and deposit the door at the workstation 40.

Figure 3:
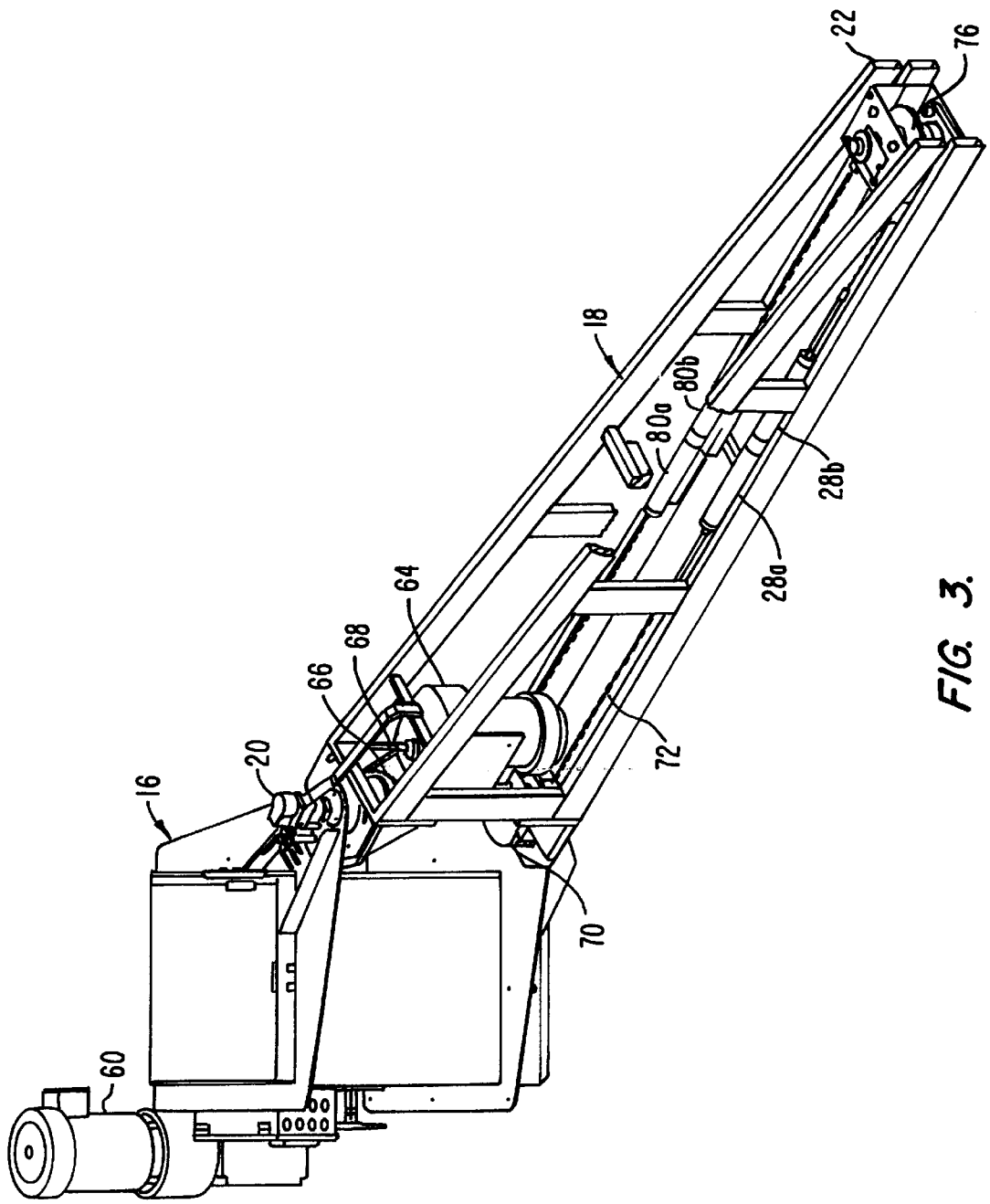
FIG. 3 is a view of the swing arm of the door transport system of FIG. 1.

Turning now to FIG. 3, the carriage 16 and the swing arm 18 it carries are shown in greater detail. (The respective top and side panels 18a, 18b of the swing arm seen in FIG. 1 that enclose the working parts of the swing arm are shown removed in FIG. 3 for clarity.) As FIG. 3 shows, the carriage 16 has mounted to it an electric carriage motor 60 that, through conventional gearing and a gear track mounted to the column 14 (not shown) provides vertical movement of the carriage along the column 14 (FIG. 1).

The swing arm 18 is, as explained above, pivotally mounted at a vertical pivot 20 for movement about the pivot that is effected by an arm rotation motor 64 carried by the swing arm 18. The arm rotation motor 64 connects to a fixed sprocket 66 by a roller chain 68. The fixed sprocket 66 is mounted to be concentric with the pivot 20.

Mounted, also concentric to the pivot 20 and the fixed sprocket 66, is a master sprocket 70 that is coupled, by an arm chain 72, to a slave sprocket 76 mounted proximate the distal end 22 of the swing arm 18. Included in each leg of the arm chain 72 is a pair of positioning cylinders 78 (78a, 78b) and 80, (80a, 80b). As will be explained more fully below, operation of the arm rotation motor 64 will cause rotation of the swing arm 18 about the pivot point 20 and, at the same time, rotation of the gripper mechanism 26, relative to the swing arm, in a manner that maintains the alignment of the gripper mechanism 26 with the pick-up stations 50, and the stacks 52 of doors thereat as, generally seen in FIG. 2.

Preferably, the cylinders 78, 80 are pneumatic, primarily for reasons of expense. Hydraulic cylinders can also be used which, as those skilled in this art will recognize, will provide near infinite positioning of the gripper mechanism 26, in which case only two cylinders would be needed, rather than the two pairs four cylinders) shown in Figures. Alternatively, other means may be used in place of the cylinders 78, 80, such as electric motors or stepper motors. However, whatever is used, care should be taken to ensure that the positioning of the gripper mechanism 26 is known when power is restored after a power loss.

Figure 4:
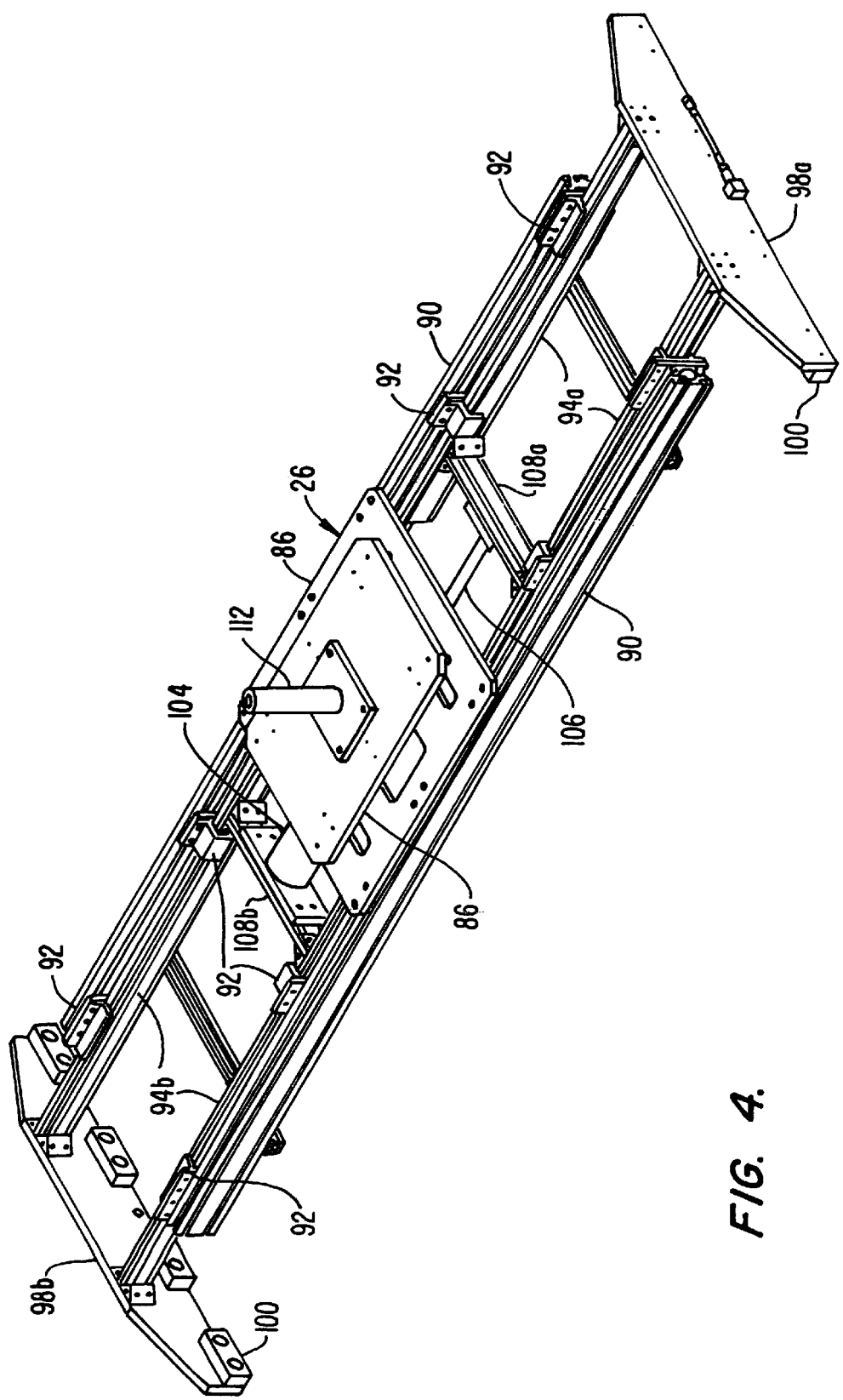
FIG. 4 is a detailed view of the door grasping mechanism forming a part of the door transport system of FIG. 1.

The gripper mechanism 26 is shown in greater detail in FIG. 4. The gripper mechanism 26 is connected to the distal end 22 of the swing arm 18 by apparatus that includes a pivot mount plate 86 and a pivot mount 88 attached to a pair of spaced-apart rails 90. The rails 90 carry linear bearings 92 which hold slide rail pairs 94a, 94b. Attached at opposite ends of the slide rail pairs 94a, 94b are clamp plates 98 which carry, on their inward confronting surfaces, clamp pads 100. A pneumatic clamp cylinder 104 and its associated piston arm 106 attaches to and extends between a pair of cross-rails 108a, 108b which, in turn, are respectively attached and extend between the two rails that make up each slide rail pairs 94a, 94b.

Actuation of the clamp cylinder 104 will move the clamp plates towards and away from one another for gripping and releasing, respectively, a door from a pick-up stack 52 to transport the door to, and dispense it at, workstation 40.

Continuing with FIG. 4, an upright rotation post 112 extends from the pivot mount 86. The rotation post 112 is structured and configured to be fixedly mounted to the end 22 of the swing arm 18 and in fixed relation with the slave sprocket 76 so that movement of the slave sprocket produces rotational movement of the gripper mechanism 26.

Figure 5A:
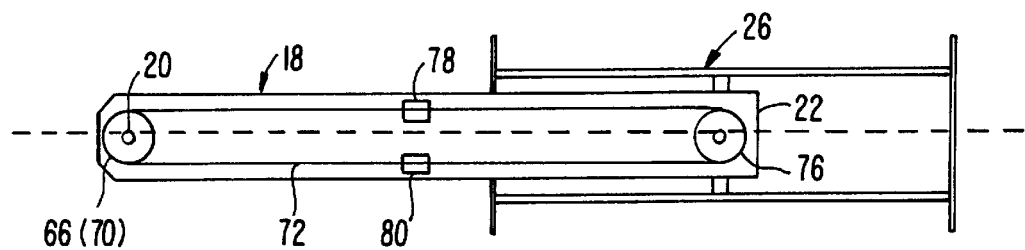
FIGS. 5A and 5B are diagrammatic illustrations of the operation of the swing arm and door grasping mechanism, showing the unchanged orientation of the door grasping mechanism as the swing arm pivots about a pivot point.
Figure 5B:
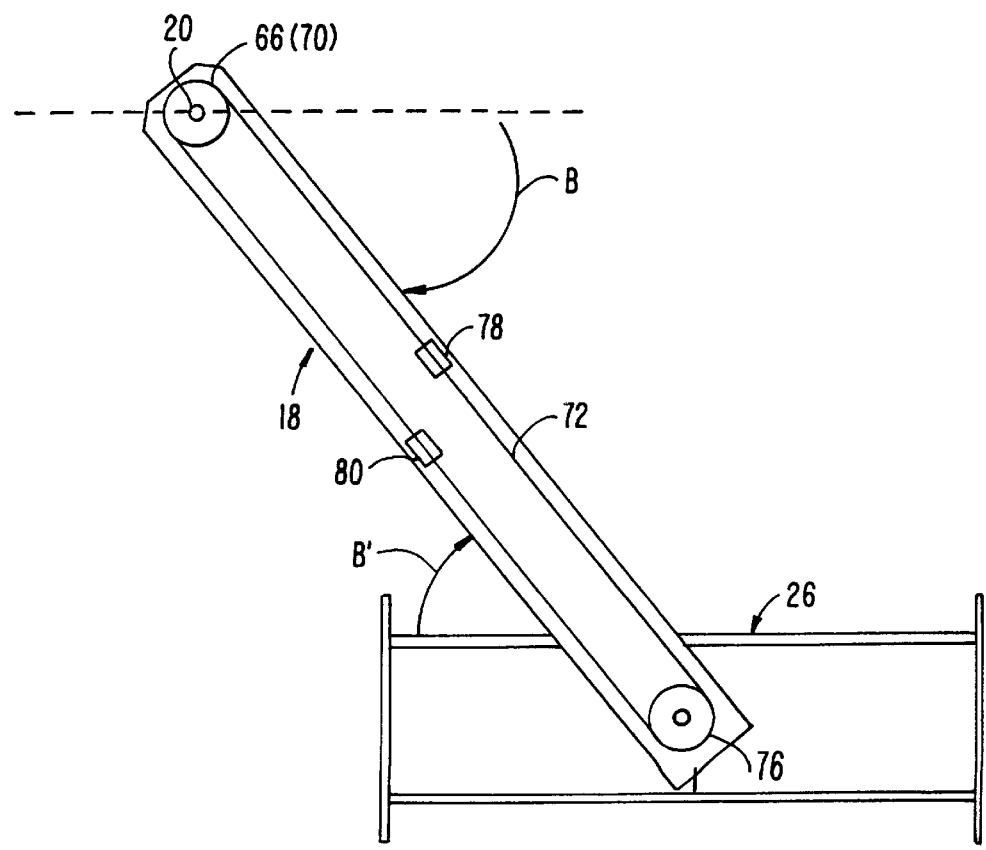

FIGS. 5A and 5B diagrammatically illustrate the ability to maintain the positional relationship of gripper mechanism 26, relative to the workstation and pick-up stations 40, 50 (FIG. 2), during rotational movement of the swing arm 18. As explained above, when the motor 64 is actuated, the swing arm 18, through the roller chain 68 and the fixed sprocket 66 (FIG. 3), is rotated along the arc A (FIG. 2) in one direction or another about the pivot 20. Rotation of the swing arm 18 is relative to the master sprocket 70 (which is fixed) to effect movement of the chain 72 and therewith sprocket 76. Thus, as the swing arm 18 rotates, the gripper mechanism 26 is also rotated in a manner and amount that causes the gripper mechanism to maintain its orientation regardless of the position to which the swing arm 18 is rotated. For example, FIG. 5A shows the swing arm 18 in a position that locates the long dimension of the gripper mechanism 26 parallel with the long dimension of the swing arm. However, as the swing arm 18 rotates through, for example, the arc B as shown in FIG. 5B, the rotation of the swing arm 18 about the pivot point 20 and fixed sprocket 66, 70 will cause a rotation of the slave sprocket 76 through movement of the chain 72. Thereby is produced a rotation of the amount B' of the gripper mechanism 26 to keep the gripper mechanism aligned with the workstation 40 and pickup stations 50. (See also FIG. 2.)

Of course, it will be evident to those skilled in the art that in order to produce a rotation of the gripper mechanism 26 through an arc substantially the same as that of swing arm 18, the master and slave sprockets 70, 76 must be of substantially the same diameter.

Another feature of the invention, also outlined above, is the ability to rotate the gripper mechanism 26 substantially 180° in order to allow doors to be pre-prepared with different handedness. As used herein, "handedness" refers to which side of the door is the hinge side (or the lock side). For example, when viewing a door that opens away from the viewer, the handedness (i.e., the side of the door at which it is hinged) can either be the right hand side or the left hand side. In order to preclude having to duplicate door finishing equipment, i.e., redundant hinge routers and lock drills, it is preferable that the work station 40 have routing/drill apparatus for one door edge only. However, the invention enables the workstation 40 to be utilized to prepare a door without regard to its handedness by employing the ability to rotate the gripper mechanism 26. For example, a stack of doors 52a may need to be prepared so that some have left handedness and others a right handedness. A door may be transported, therefore, by the system 10 (FIGS. 1 and 2) from the stack 52a to the work station 40 for a right handed preparation (hinges on one side), and another door similarly transported, but rotated 180°, for left handed preparation (hinges on the other side).

Figure 6A:
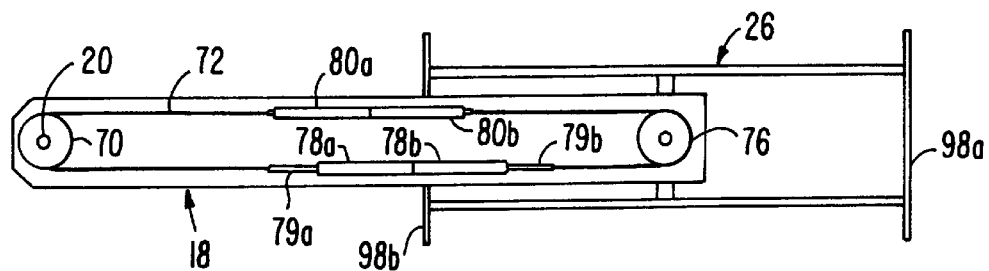
FIGS. 6A, 6B, and 6C are diagrammatic illustrations of the rotational operation of the gripper mechanism.
Figure 6B:
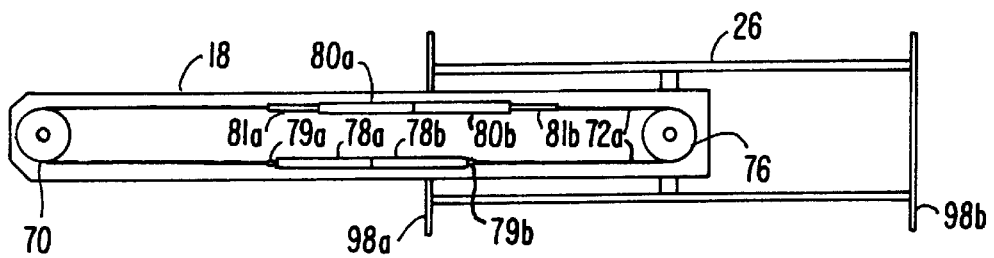

Rotating the gripper mechanism 26 is accomplished by selective extension/retraction of the cylinder arms of rotation cylinders 78, 80. This is illustrated diagrammatically in the diagrams shown in FIGS. 6A, 6B. In FIG. 6A, the cylinders 78, 80 are actuated to position the clamp plates 98a, 98b as shown in the figure: with the clamp plate 98b located inward (toward pivot 20). This position is established by actuating the cylinder pair 78 to extend their corresponding cylinder arms 79 (79a, 79b) as shown in FIG. 6A. The corresponding cylinder arms (81 (81a, 81b) of the cylinder pair 80 are retracted.

180° rotation of the gripper mechanism 26 is accomplished by retracting the cylinder arms 79 of positioning cylinders 78 while at the same time extending the cylinder arms 81 of the cylinders 80. This will cause the portion 72a of the chain 72 between the piston pairs, and wrapping around the slave sprocket 76, to rotate the slave sprocket and therewith the gripper mechanism 26. Thereby, the clamp plate 98a, which was formerly outward of the end 22 of the swing arm 18, assumes the inward position previously held by the clamp plate 98b (which is now in the outward location).

Figure 6C:
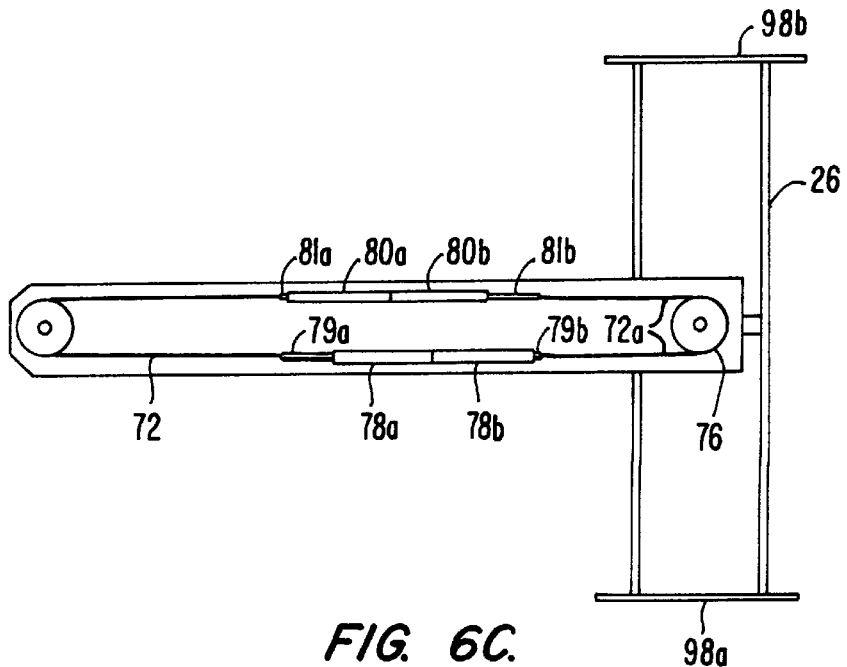
Figure 7:
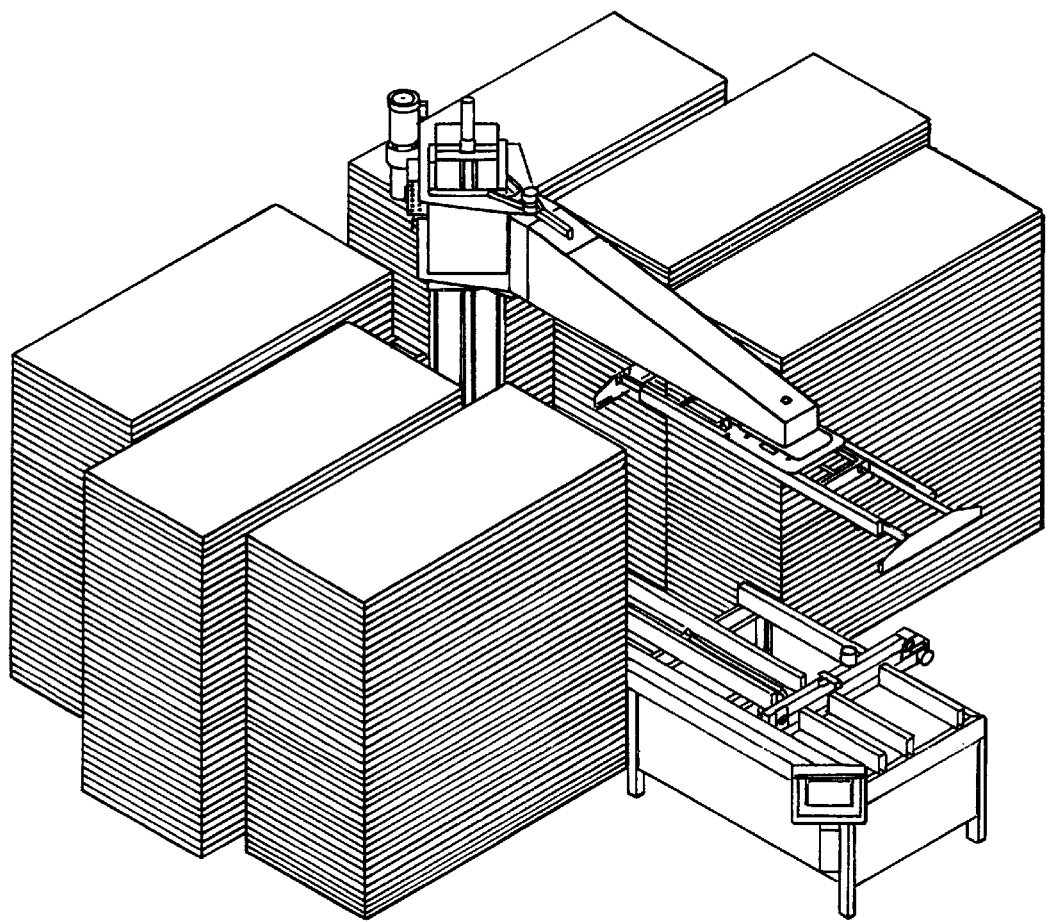
FIG. 7 is an illustration of the system of FIG. 1, showing doors stacked at six pick-up stations.

90° rotation of the gripper mechanism 26 is illustrated in FIG. 6c. Assume that the gripper mechanism 26 is in the position shown in FIG. 6A, i.e., aligned and parallel with the swing arm 18—a position that is affected by extending cylinder arms 79 of the cylinder pairs 78, while retracting the cylinder arms 81 of the cylinder pair 80. 90° rotation is achieved by actuating the cylinder 78b to retract its associated arm 79b while, at the same time, actuating the cylinder 80b to extend the associated arm 81b will rotate the slave socket 76, and with it the gripper mechanism 26, to the position shown in FIG. 6C.

The necessary electronic and pneumatic controls and switching elements needed for effecting control over the operations of the elements of system 10 are located in the control cabinet 30 (FIG. 1). Preferably, the heart of the control electronics would be microprocessor based, and specific sequences may be set up for the system 10 through the operator console 46 which may be keypad entry or touch screen entry.

The pick-up stations 50 are located at predetermined positions relative to the system 10 (e.g., column 14). Swing arm 18 may be calibrated by rotating it so that the gripper mechanism 52 overlies, for example, pick-up station 50d, whereat a microswitch stop (not shown) will sense the swing arm's orientation. Information concerning where the gripper mechanism 26 must be placed so as to overlie the pick-up stations 50a, 50b, 50c, relative to the home location of the swinger arm, overlying station 50d, may be programmed in some form of non-volatile memory such as read only memory (ROM).

While a full and complete disclosure of the invention has been provided, there are obvious modifications and changes that can be made. For example, while rotation of the gripper mechanism 26 employs cylinders 78, 80, an alternative would be to provide a stepper motor, or other mode of means, to rotate the master sprocket 70.

What is claimed is:

1. A door transport system, comprising:
    an upright column:
        a carriage mounted for vertical movement along the upright column;
        a swing arm having one end mounted to the carriage for pivotal movement about a pivot point and extending from the carriage;
        a door gripper mechanism pivotally mounted to a distal end of the swing arm and with a predetermined orientation; and
        means for moving the swing arm about the pivot point to position the distal end in a first position overlying a door pickup station or a second position overlying a work station, the means for moving including a motor carried by the swing arm;

the swing arm including a master sprocket positioned concentric with the pivot point, a slave sprocket positioned at the distal end and connected to the door pickup mechanism, and a connection element linking the master and slave sprockets to one another so that movement of the swing arm substantially maintains the predetermined orientation.

2. The door transport system of claim 1, wherein the door pickup mechanism includes a pair of members coupled to one another for slidable engagement, the pair of members each having depending wall members configured to grasp opposing peripheries of a door for pickup.

3. The door transport system of claim 2, including a cylinder mounted to the gripper mechanism for sliding movement of the pair of members between an extended position and a non-extended position to move the depending wall members into grasping relation with opposing peripheries of a door for pickup.

4. The door transport system of claim 1, wherein the connection element includes a chain connecting the master and slave sprockets to one another and configured to operate with the master and slave sprockets to cause rotation of the slave sprocket and therewith the pickup mechanism when the swing arm is rotated about the pivot point.

5. The door transport system of claim 4, including at least first and second cylinders connected to form a part of the connection element with the chain, each of the first and second cylinders having an associated extendable/retractable arm so that the first cylinder is operated to extend its associated arm while the second cylinder retracts its associated arm to cause rotation of the gripper mechanism to change the predetermined orientation to a second orientation.

6. The door transport system of claim 5, wherein the second orientation is 90 degrees from the predetermined orientation.

7. The door transport system of claim 5, wherein the second orientation is 180 degrees from the predetermined orientation.

8. The door transport system of claim 5, wherein the first and second cylinders are pneumatic.

9. The door transport system of claim 5, wherein the first and second cylinders are hydraulic.

10. The door transport system of claim 1, wherein the connection element includes a chain that forms a loop that encircles the master and slave sprockets to connect one to the other, with first and second chain sections extending between the master and slave sprockets, the chain being configured to operate with the master and slave sprockets to effect rotation of the slave sprocket and therewith the gripper mechanism when the swing arm is rotated about the pivot point, and including a first pair of cylinders connected in a first section of the chain and a second pair of cylinders connected in the other section of the chain, each of the cylinders of the first and second pairs of cylinders having an associated extendable/retractable rod so that a first of the cylinders of one of the pairs of cylinders is operated to extend its associated rod while a second cylinder of the other of the pairs of cylinders retracts its associated rod to cause rotation of the gripper mechanism to change the predetermined orientation to a second orientation.

11. The door transport system of claim 10, wherein the second orientation is substantially 90 degrees from the predetermined orientation.

12. The door transport system of claim 10, wherein the cylinders of one of the pairs of cylinders are operated to extend their associated rods while the cylinders of the other of the pairs of cylinders are operated to retract their associated rods to cause rotation of the pickup mechanism to change the predetermined orientation to a third orientation.

13. The door transport system of claim 12, wherein the third operation is 180 degrees from the predetermined orientation.

14. The door transport system of claim 12, wherein each of the first and second pairs of cylinders is pneumatic.

15. The door transport system of claim 12, wherein each of the first and second pairs of cylinders is hydraulic.

16. A door transport system, including
a swing arm having one end mounted for pivotal movement about a pivot point, the swing arm having a distal end located generally horizontally from the pivot point;

a door gripper mechanism pivotally mounted to the distal end of the swing arm and with a predetermined orientation; and a motor coupled to the swing arm for moving the swing arm about the pivot point to position the distal end in overlying relation to at least a door pickup station and a work station;

the swing arm including a master sprocket positioned concentric with the pivot point, a slave sprocket positioned at the distal end and connected to the door gripper mechanism, and a chain connecting the master and slave sprockets to one another so that movement of the swing arm substantially maintains the predetermined orientation, the chain including at least first and second cylinders connected to form a part of the chain, each of the first and second cylinders having an associated extendable/retractable rod so that the first cylinder is operated to extend its associated rod while the second cylinder retracts its associated rod to cause rotation of the door gripper mechanism to change the predetermined orientation to a second orientation.

17. The door transport system of claim 16, wherein the first and second cylinders are pneumatic.

18. The door transport system of claim 16, wherein the second orientation is 90 degrees from the predetermined orientation.

19. The door transport system of claim 16, including an upright column and a carriage mounted for movement along the column; the swing arm being mounted to the carriage.

20. The door transport system of claim 19, wherein the distal end of the swing arm is movable between a pickup position generally overlying the pickup station and a drop position generally overlying the work station.

* * * * *